(12) United States Patent
Komaru et al.

(10) Patent No.: US 12,281,962 B2
(45) Date of Patent: Apr. 22, 2025

(54) WATERTIGHTNESS TESTING DEVICE AND WATERTIGHTNESS TESTING METHOD

(71) Applicant: KUBOTA CORPORATION, Osaka (JP)

(72) Inventors: Yuito Komaru, Amagasaki (JP); Masataka Shimomura, Amagasaki (JP); Daichi Higasa, Amagasaki (JP); Kohei Ikeda, Amagasaki (JP)

(73) Assignee: KUBOTA CORPORATION, Osaka (JP)

( * ) Notice: Subject to any disclaimer, the term of this patent is extended or adjusted under 35 U.S.C. 154(b) by 309 days.

(21) Appl. No.: 17/911,925

(22) PCT Filed: Mar. 15, 2021

(86) PCT No.: PCT/JP2021/010301
§ 371 (c)(1),
(2) Date: Sep. 15, 2022

(87) PCT Pub. No.: WO2021/187403
PCT Pub. Date: Sep. 23, 2021

(65) Prior Publication Data
US 2023/0141092 A1    May 11, 2023

(30) Foreign Application Priority Data
Mar. 16, 2020    (JP) .................. 2020-044863

(51) Int. Cl.
*G01M 3/04*    (2006.01)
*F16L 101/30*    (2006.01)
(Continued)

(52) U.S. Cl.
CPC .............. *G01M 3/04* (2013.01); *G01M 3/005* (2013.01); *G01M 3/2853* (2013.01); *F16L 2101/30* (2013.01)

(58) Field of Classification Search
CPC .......... G01M 3/04; G01M 3/005; G01M 3/28; G01M 3/00; F16L 2101/30
See application file for complete search history.

(56) References Cited

U.S. PATENT DOCUMENTS 4,039,087 A * 8/1977 Sandvick, Sr. ............ F16L 1/09
29/237
4,852,393 A    8/1989 Pate et al.
(Continued)

FOREIGN PATENT DOCUMENTS

| CN | 109060257 A | 12/2018 |
|---|---|---|
| EP | 0 378 480 A1 | 7/1990 |
| EP | 0 378 480 B1 | 5/1992 |
| JP | 2003-294571 A | 10/2003 |
| JP | 2013-040866 A | 2/2013 |
| JP | 2015-099056 A | 5/2015 |

OTHER PUBLICATIONS

International Search Report from corresponding International Patent Application No. PCT/JP2021/010301 dated Jun. 1, 2021.
(Continued)

*Primary Examiner* — Helen C Kwok
(74) *Attorney, Agent, or Firm* — RENNER, OTTO, BOISSELLE & SKLAR, LLP

(57) ABSTRACT

A watertightness testing device (1) for performing a watertightness test of a joined section between joined pipes (2 and 3), the watertightness testing device (1) including a testing device body (21) and a moving operation rod (22) for moving the testing device body (21) in the pipes in a pipe axial direction (B) from outside an end section of the pipes, wherein the moving operation rod (22) is provided in the testing device body (21) and extends along the pipe axial direction (B), main supporting members (61 and 62) for supporting the moving operation rod (22) are provided on the moving operation rod (22) outside the pipe (2), and the main supporting members (61 and 62) have a rotatable main rolling member (75) in a lower end section, the main supporting members (61 and 62) are switchable between a
(Continued)

supporting posture (K) in which the main supporting members (61 and 62) support the moving operation rod (22) outside of the pipes and a folded posture in which the main supporting members (61 and 62) are folded inside the pipes, and the main supporting members (61 and 62) are urged from the folded posture toward the supporting posture (K).

14 Claims, 16 Drawing Sheets

(51) Int. Cl.
      *G01M 3/00*        (2006.01)
      *G01M 3/28*        (2006.01)

(56)                    References Cited

U.S. PATENT DOCUMENTS

| | | | |
|---|---|---|---|
| 2016/0290540 A1* | 10/2016 | Kishi | F16L 1/09 |
| 2022/0040931 A1* | 2/2022 | Hornbacher | G08B 5/00 |
| 2023/0139386 A1* | 5/2023 | Komaru | G01M 3/005 |
| | | | 73/49.1 |

OTHER PUBLICATIONS

Extended European Search Report issued in corresponding European Patent Application No. 21 772 611.6 dated Aug. 11, 2023.

* cited by examiner

WATERTIGHTNESS TESTING DEVICE AND WATERTIGHTNESS TESTING METHOD

TECHNICAL FIELD

The present invention relates to a watertightness testing device and a watertightness testing method for performing a watertightness test of a joined section of pipes.

BACKGROUND ART

Conventionally, as a watertightness testing device of this type, as shown in FIG. 16, there is a watertightness testing device including a testing device body 124 which performs a watertightness test of a joined section 123 of pipes 121 and 122 inside the pipes 121 and 122 and a moving operation rod 125 for moving the testing device body 124 inside the pipes 121 and 122 in a pipe axial direction B.

The testing device body 124 includes a cylindrical member 127 and a pair of annular water stop bags 128 which are provided in the cylindrical member 127 and of which a diameter-expanding operation can be performed. An annular sealed space 129 enclosed by both water stop bags 128 of which a diameter-expanding operation has been performed to a water-stopping state, an outer circumferential surface of the cylindrical member 127, and inner circumferential surfaces of the pipes 121 and 122 is formed in the joined section 123.

The testing device body 124 inspects water leakage from an elastic seal 131 of the joined section 123 by supplying water 130 for a water pressure test from a water filling pipe 132 to inside of the sealed space 129, filling the sealed space 129 with the water 130, and applying water pressure.

The moving operation rod 125 is attached to the cylindrical member 127 of the testing device body 124 and extends along the pipe axial direction B.

Accordingly, by performing an operation of pushing or pulling the moving operation rod 125 in the pipe axial direction B, a worker can move the testing device body 124 in the pipes 121 and 122 in the pipe axial direction B and position the testing device body 124 at the joined section 123. In addition, after performing a watertightness test with respect to the joined section 123 of the pipes 121 and 122, the worker can move the moving operation rod 125 in the pipe axial direction B and take the testing device body 124 outside from an opening end section of the pipe 122.

Refer to Japanese Patent Laid-Open No. 2013-40866 for information on the watertightness testing device described above.

SUMMARY OF INVENTION

Technical Problem

However, in the watertightness testing device described in Japanese Patent Laid-Open No. 2013-40866, since the moving operation rod 125 is an elongated member, the moving operation rod 125 is disadvantageously susceptible to downward deflection due to its own weight. In addition, due to stress acting on an attaching portion between the moving operation rod 125 and the cylindrical member 127, a base of the moving operation rod 125 is disadvantageously susceptible to damage.

Therefore, the moving operation rod 125 must be supported by a support table or the like before joining the pipe 122 to the pipe 121, and there is a risk that the support table may become a hindrance to pipe-joining work when joining the pipe 122 to the pipe 121.

An object of the present invention is to provide a watertightness testing device and a watertightness testing method capable of preventing a moving operation rod from becoming deflected or damaged.

Solution to Problem

A watertightness testing device for performing a watertightness test of a joined section between joined pipes according to the present invention includes:

a testing device body which performs a watertightness test of the joined section of the pipes in the pipes and a moving operation rod for moving the testing device body in the pipes in a pipe axial direction from outside an end section of the joined pipes, wherein the moving operation rod is provided in the testing device body and extends along the pipe axial direction, a main supporting member for supporting the moving operation rod is provided on the moving operation rod outside of the pipes, and the main supporting member has a rotatable main rolling member in a lower end section, the main supporting member is switchable between a supporting posture in which the main supporting member supports the moving operation rod outside of the pipes and a folded posture in which the main supporting member is folded inside the pipes, and the main supporting member is urged from the folded posture toward the supporting posture.

Accordingly, when joining the pipes to each other, the main supporting member is switched to the supporting posture in a state where the testing device body is inserted into the pipes and the main supporting member supports the moving operation rod protruding outside from an end section of the pipes. As result, the moving operation rod can be prevented from becoming deflected or damaged.

In addition, by operating the moving operation rod in the pipe axial direction in a state where the main supporting member is switched to the supporting posture and supports the moving operation rod protruding outside from an end section of the pipes, the testing device body inside the pipes can be moved in the pipe axial direction. In doing so, since the main rolling member of the main supporting member rotates along the pipe axial direction on a pipe installation surface outside of an end section of the pipes, the moving operation rod can be readily operated in the pipe axial direction.

Furthermore, when inserting the moving operation rod into the pipes, the main supporting member retreats into the pipes by being switched to the folded posture. Therefore, the moving operation rod can be readily inserted into the pipes to join the pipes to each other. Accordingly, when joining the pipes to each other, the main supporting member does not become a hindrance to joining the pipes.

With the watertightness testing device according to the present invention, preferably, an auxiliary supporting member which supports the moving operation rod inside the pipes is provided on the moving operation rod, and the auxiliary supporting member has a rotatable auxiliary rolling member in a lower end section.

Accordingly, when the moving operation rod is being inserted into the pipes, the auxiliary supporting member supports the moving operation rod inside the pipes. As result, the moving operation rod can be prevented from becoming deflected or damaged.

In addition, when operating the moving operation rod in the pipe axial direction, since the auxiliary rolling member rotates along the pipe axial direction on a pipe inner surface, the moving operation rod can be readily operated in the pipe axial direction.

With the watertightness testing device according to the present invention, preferably, a tip section of the moving operation rod protrudes outside from an end section of the joined pipes in a state where the testing device body is positioned in the joined section of the pipes.

Accordingly, after positioning the testing device body at the joined section of the pipes and performing a watertightness test of the joined section, the tip section of the moving operation rod can be readily operated from outside an end section of the pipes.

With the watertightness testing device according to the present invention, preferably, the testing device body has a rotatable moving rolling member for moving inside the pipes in the pipe axial direction.

Accordingly, by operating the moving operation rod in the pipe axial direction, the testing device body readily and smoothly moves inside the pipes in the pipe axial direction in conjunction with the moving operation rod.

A watertightness testing method using the watertightness testing device according to the present invention includes:
  supporting a moving operation rod protruding outside from an end section of a first pipe with a main supporting member in a supporting posture in a state where a testing device body is being inserted into the first pipe;
  moving a second pipe in a joining direction toward the end section of the first pipe;
  causing the main supporting member to be switched from the supporting posture to a folded posture and to retreat into the second pipe by having one end section of the second pipe come into contact with the main supporting member and push the main supporting member in the joining direction;
  joining the one end section of the second pipe to the end section of the first pipe in a state where the moving operation rod is inserted into the second pipe; operating the moving operation rod from outside of another end section of the second pipe to move the testing device body to a joined section between the first pipe and the second pipe; and
  after performing a watertightness test of the joined section with the testing device body, by operating the moving operation rod from outside of the other end section of the second pipe to move the testing device body from the joined section toward the other end section of the second pipe, causing the main supporting member to protrude outside from the other end section of the second pipe, to be switched from the folded posture toward the supporting posture, and to support the moving operation rod protruding outside from the other end section of the second pipe.

Accordingly, since the moving operation rod protruding outside from the end section of the first pipe is supported by the main supporting member in the supporting posture in a state where the testing device body is being inserted into the first pipe, the moving operation rod can be prevented from becoming deflected or damaged.

In addition, since the main supporting member is switched to the folded posture and retreats into the second pipe when joining the one end section of the second pipe to the end section of the first pipe, the main supporting member does not become a hindrance to joining the pipes.

In addition, after joining the pipes to each other and performing a watertightness test, by operating the moving operation rod in the pipe axial direction from outside of the other end section of the second pipe to move the testing device body from the joined section toward the other end section of the second pipe, the main supporting member is switched to the supporting posture and supports the moving operation rod protruding outside from the other end section of the second pipe. In doing so, since the main rolling member of the main supporting member rotates along the pipe axial direction on a pipe installation surface outside of the other end section of the second pipe, the moving operation rod can be readily operated in the pipe axial direction.

With the watertightness testing method according to the present invention, preferably, the auxiliary supporting member provided on the moving operation rod supports the moving operation rod in the second pipe in a state where the moving operation rod is being inserted into the second pipe.

Accordingly, when the moving operation rod is being inserted into the second pipe, the auxiliary supporting member supports the moving operation rod inside the second pipe. As result, the moving operation rod can be prevented from becoming deflected or damaged.

Advantageous Effects of Invention

As described above, according to the present invention, when joining the pipes to each other, the main supporting member is switched to the supporting posture in a state where the testing device body is inserted into the pipes and the main supporting member supports the moving operation rod protruding outside from an end section of the pipes. As result, the moving operation rod can be prevented from becoming deflected or damaged.

DESCRIPTION OF EMBODIMENTS

Figure 1:
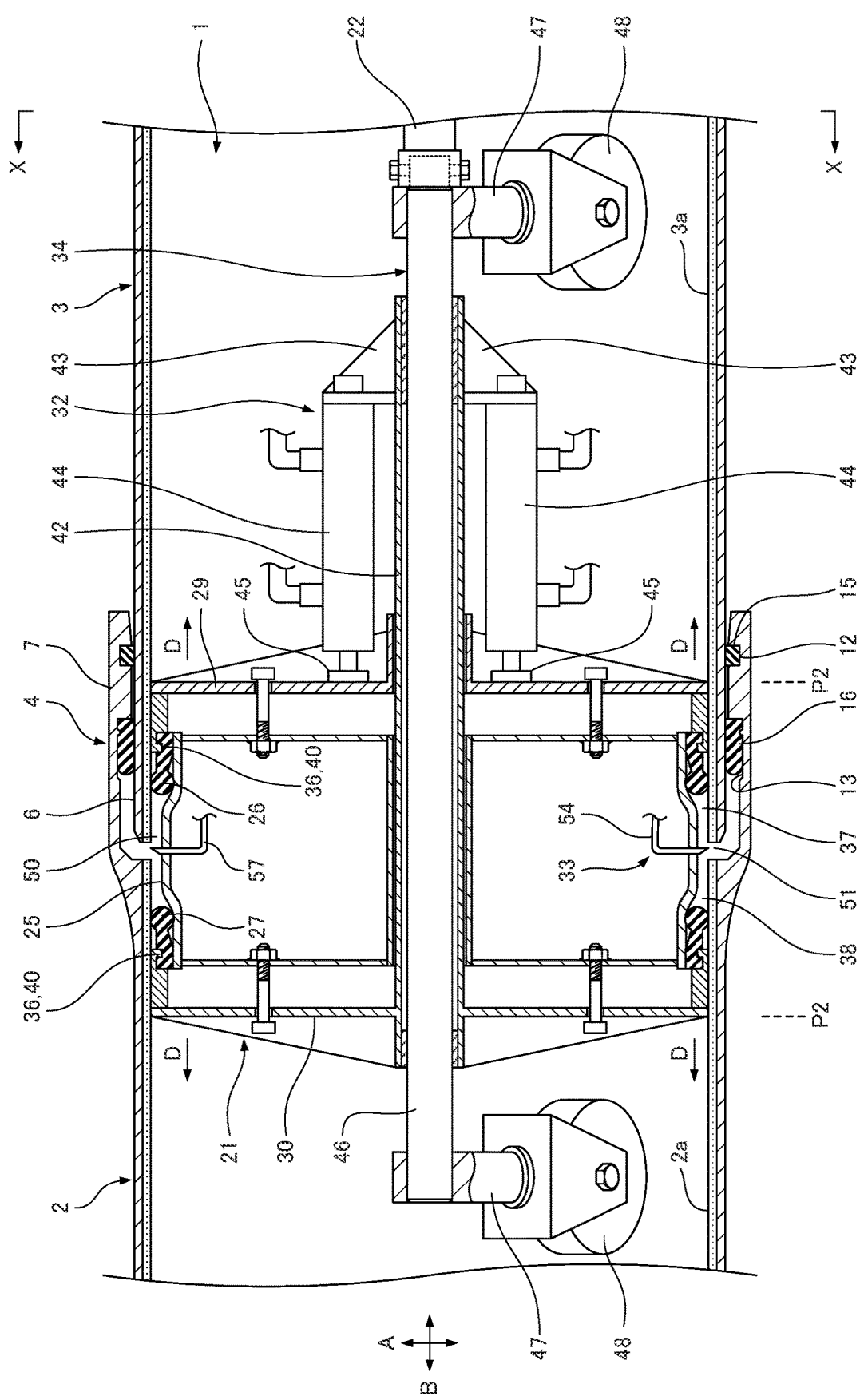
FIG. 1 is a sectional view of a watertightness testing device according to a first embodiment of the present invention showing a state where indentation of first and second sealing members has been released.

Hereinafter, embodiments of the present invention will be described with reference to the drawings.

First Embodiment

In the first embodiment, as shown in FIGS. 1 to 4, reference numeral 1 denotes a watertightness testing device for performing a watertightness test of a joined section 4 between joined pipes 2 and 3. The pipes 2 and 3 are each a PN type pipe made of ductile cast iron (an example of a ductile cast-iron pipe) having a spigot 6 at one end section and a socket 7 at another end section. The pipes 2 and 3 are joined and arranged inside a conduit installation tunnel 9 formed underground and constitute a conduit 10 (refer to FIG. 12).

In the joined section 4, joining is achieved by inserting the spigot 6 of a second pipe 3 into the socket 7 of a first pipe 2. A locking-ring housing groove 12 and a sealing body mounting depression 13 are formed on an inner circumferential surface of the socket 7.

A locking-ring 15 for preventing separation is housed in the locking-ring housing groove 12. In addition, an annular sealing body 16 made of an elastic material such as rubber is mounted to the sealing body mounting depression 13. The sealing body 16 is sandwiched between an outer circumferential surface of the spigot 6 and the inner circumferential surface of the socket 7 and compressed in a pipe diameter direction A. Accordingly, sealing is achieved between the spigot 6 and the socket 7.

The watertightness testing device 1 includes a testing device body 21 which performs a watertightness test of the joined section 4 inside the pipes 2 and 3 and a moving operation rod 22 for moving the testing device body 21 inside the pipes 2 and 3 in a pipe axial direction B.

The testing device body 21 will be described below.

The testing device body 21 has a cylindrical core 25, first and second sealing members 26 and 27, first and second indenting members 29 and 30, a moving device 32, a testing fluid supplying device 33, and a supporting device 34.

The first sealing member 26 is an annular member made of an elastic material such as rubber and provides a seal between an outer circumferential surface of the core 25 and an inner circumferential surface of the second pipe 3. In addition, the second sealing member 27 is an annular member made of an elastic material such as rubber and provides a seal between the outer circumferential surface of the core 25 and an inner circumferential surface of the first pipe 2.

An engaging depression 36 is formed around a whole circumference on each outer circumferential surface of a proximal end section of the first and second sealing members 26 and 27.

A first sealing member insertion space 37 is formed around a whole circumference between the outer circumferential surface of the core 25 and the inner circumferential surface of the second pipe 3. In addition, a second sealing member insertion space 38 is formed around a whole circumference between the outer circumferential surface of the core 25 and the inner circumferential surface of the first pipe 2.

The first indenting member 29 indents and compresses the first sealing member 26 into the first sealing member insertion space 37 and has an engaging protrusion 40 formed around a whole circumference.

In addition, the second indenting member 30 indents and compresses the second sealing member 27 into the second sealing member insertion space 38 and has the engaging protrusion 40 in a similar manner to the first indenting member 29.

The engaging protrusion 40 of the first indenting member 29 is fitted into the engaging depression 36 of the first sealing member 26. Accordingly, the first sealing member 26 and the first indenting member 29 engage each other in the pipe axial direction B. In addition, the engaging protrusion 40 of the second indenting member 30 is fitted into the engaging depression 36 of the second sealing member 27. Accordingly, the second sealing member 27 and the second indenting member 30 engage each other in the pipe axial direction B.

The moving device 32 is a device that moves the first indenting member 29 and the second indenting member 30 in an indenting direction C (refer to FIG. 2) in which both indenting members 29 and 30 approach each other in the pipe axial direction B and an indentation releasing direction D (refer to FIG. 1) in which both indenting members 29 and 30 separate from each other in the pipe axial direction B.

Specifically, the moving device 32 has a pipe-like mobile rod 42 which is attached to the second indenting member 30 and which is movable in the pipe axial direction B, a receiving member 43 provided in a tip section of the mobile rod 42, and a plurality of double-acting jacks 44 that are extensible and retractable in the pipe axial direction B. The double-acting jacks 44 are attached between the first indenting member 29 and the receiving member 43.

The supporting device 34 is a device that supports the core 25, the first and second indenting members 29 and 30, and the moving device 32 and has a shaft 46 inserted into the mobile rod 42, a plurality of leg frames 47 provided in both end sections of the shaft 46, and a moving wheel 48 rotatably provided in a lower end section of the leg frames 47. The moving wheels 48 are an example of a moving rolling member for moving the testing device body 21 in the pipe axial direction B and are capable of rolling on pipe inner surfaces 2a and 3a of the pipes 2 and 3 in the pipe axial direction B.

Figure 2:
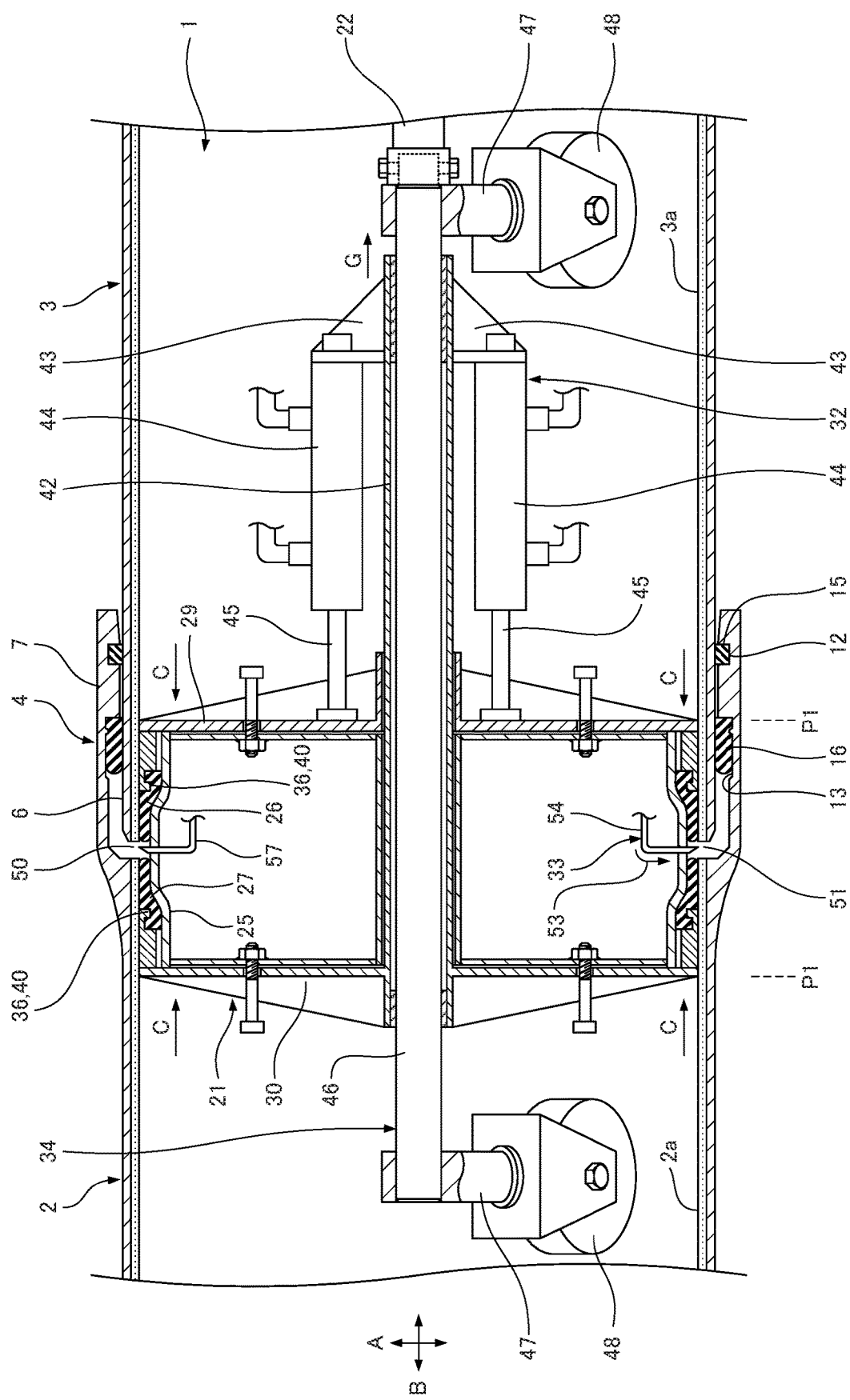
FIG. 2 is a sectional view of the watertightness testing device according to the first embodiment of the present invention showing a state where the first and second sealing members have been indented.
Figure 3:
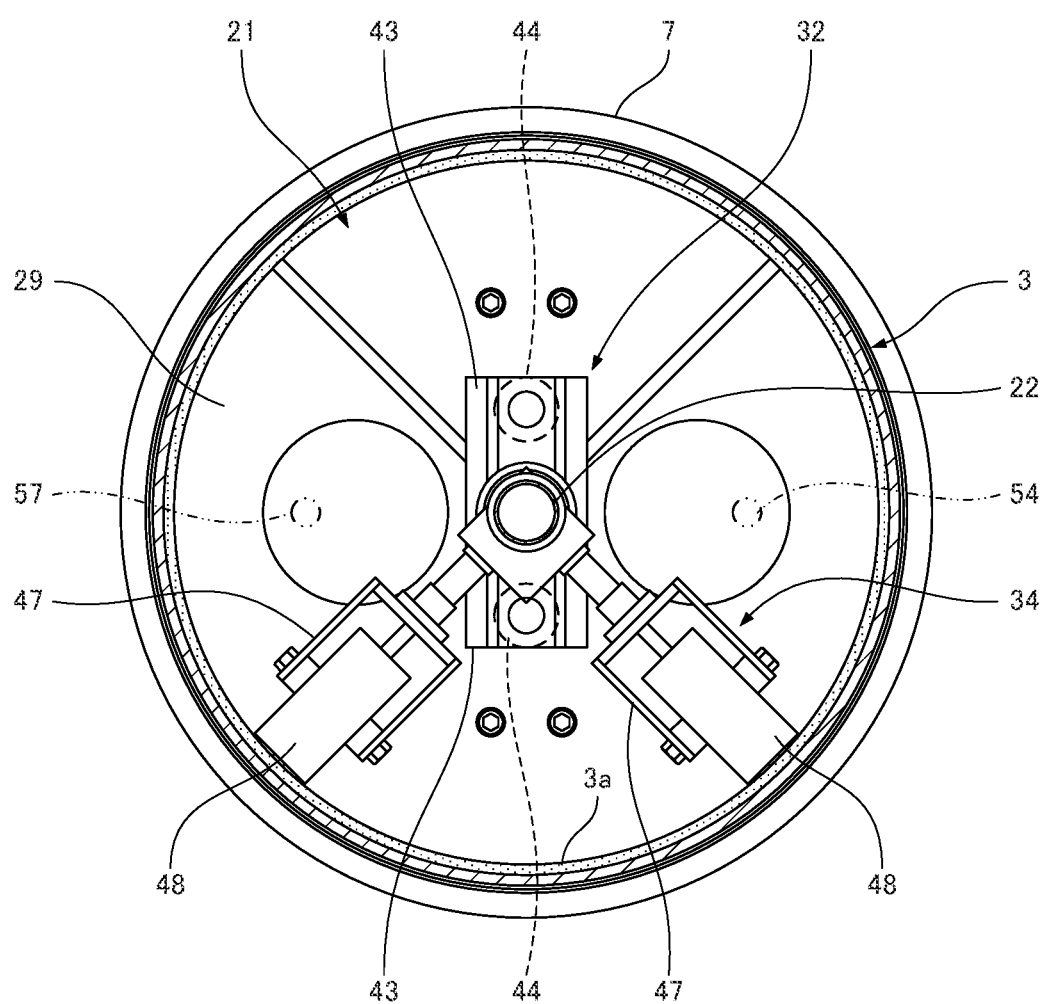
FIG. 3 is an arrow view taken along X-X in FIG. 1.

As shown in FIG. 2, when the first and second indenting members 29 and 30 move in the indenting direction C and reach an indenting position P1, the first sealing member 26 is indented into the first sealing member insertion space 37 and the second sealing member 27 is indented into the second sealing member insertion space 38.

In addition, as shown in FIG. 1, when the first and second indenting members 29 and 30 move in the indentation releasing direction D and return to an indentation releasing position P2, the indentation of the first and second sealing members 26 and 27 is released.

As shown in FIGS. 1 and 2, when the testing device body 21 is set to the joined section 4 in the pipes 2 and 3, a test space 50 is formed around a whole circumference between the outer circumferential surface of the core 25 and the inner circumferential surfaces of the pipes 2 and 3 in the pipe diameter direction A and between the first sealing member 26 and the second sealing member 27 in the pipe axial direction B. The test space 50 is communicated with the sealing body mounting depression 13 via a gap 51 between a deep end of the socket 7 and a tip of the spigot 6.

The testing fluid supplying device 33 is a device that supplies the test space 50 with water 53 (an example of a testing fluid) from inside the core 25 and has a water supply hose 54 connected to a lower part of an inner circumference of the core 25 and a hydraulic pump (not illustrated) provided at a tip of the water supply hose 54.

In addition, an air vent hose 57 for deaerating an inside of the test space 50 is connected to an upper part of the inner circumference of the core 25. The water supply hose 54 and the air vent hose 57 penetrate the first indenting member 29.

The moving operation rod 22 is attachably and detachably coupled to a tip section of the shaft 46 of the testing device body 21 and extends along the pipe axial direction B. The water supply hose 54 and the air vent hose 57 are arranged along the moving operation rod 22 from the testing device body 21.

Figure 4:
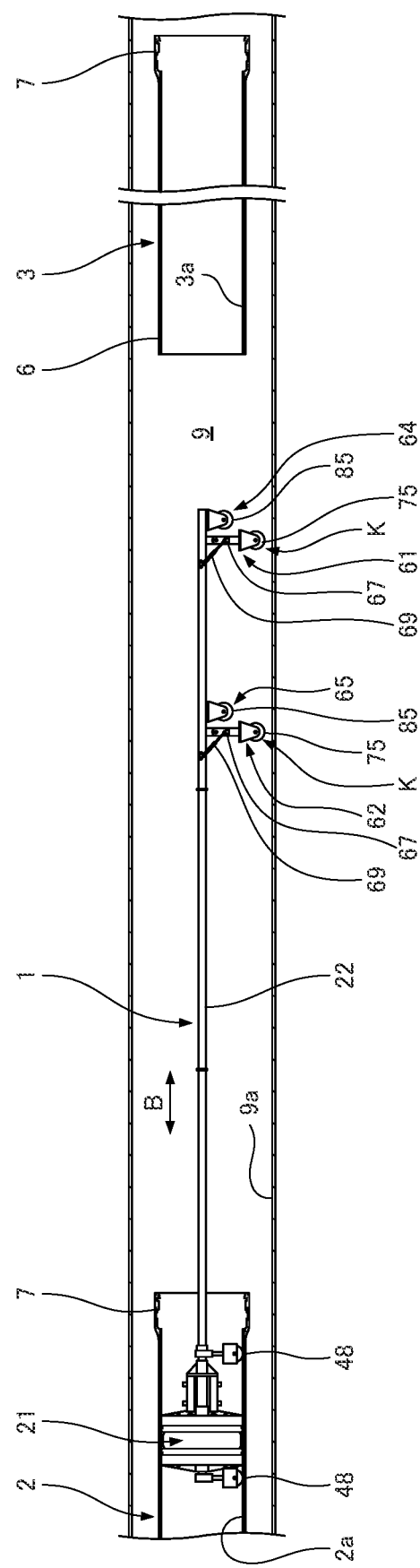
FIG. 4 is a diagram showing a procedure when performing a watertightness test using the watertightness testing device according to the first embodiment of the present invention.

As shown in FIG. 4, the moving operation rod 22 is provided with first and second main supporting members 61 and 62 which support the moving operation rod 22 on an inner wall surface 9a (an example of a pipe installation surface) of the conduit installation tunnel 9 outside of the pipes 2 and 3 and first and second auxiliary supporting members 64 and 65 which support the moving operation rod 22 on the pipe inner surface 3a inside the second pipe 3.

Figure 5:
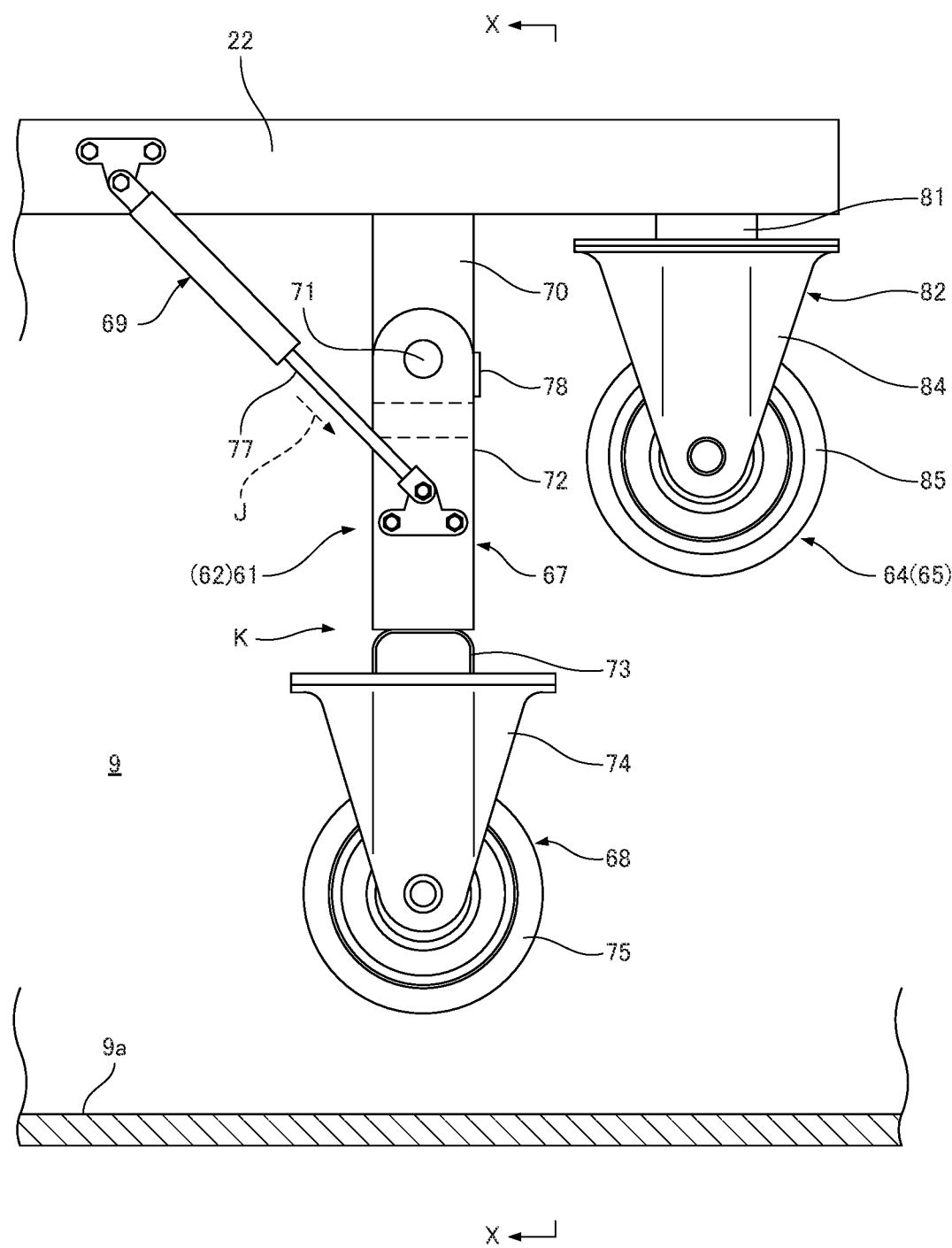
FIG. 5 is an enlarged side view of a first main supporting member and a first auxiliary supporting member of the watertightness testing device according to the first embodiment of the present invention showing a state where the first main supporting member has been switched to a supporting posture.
Figure 6:
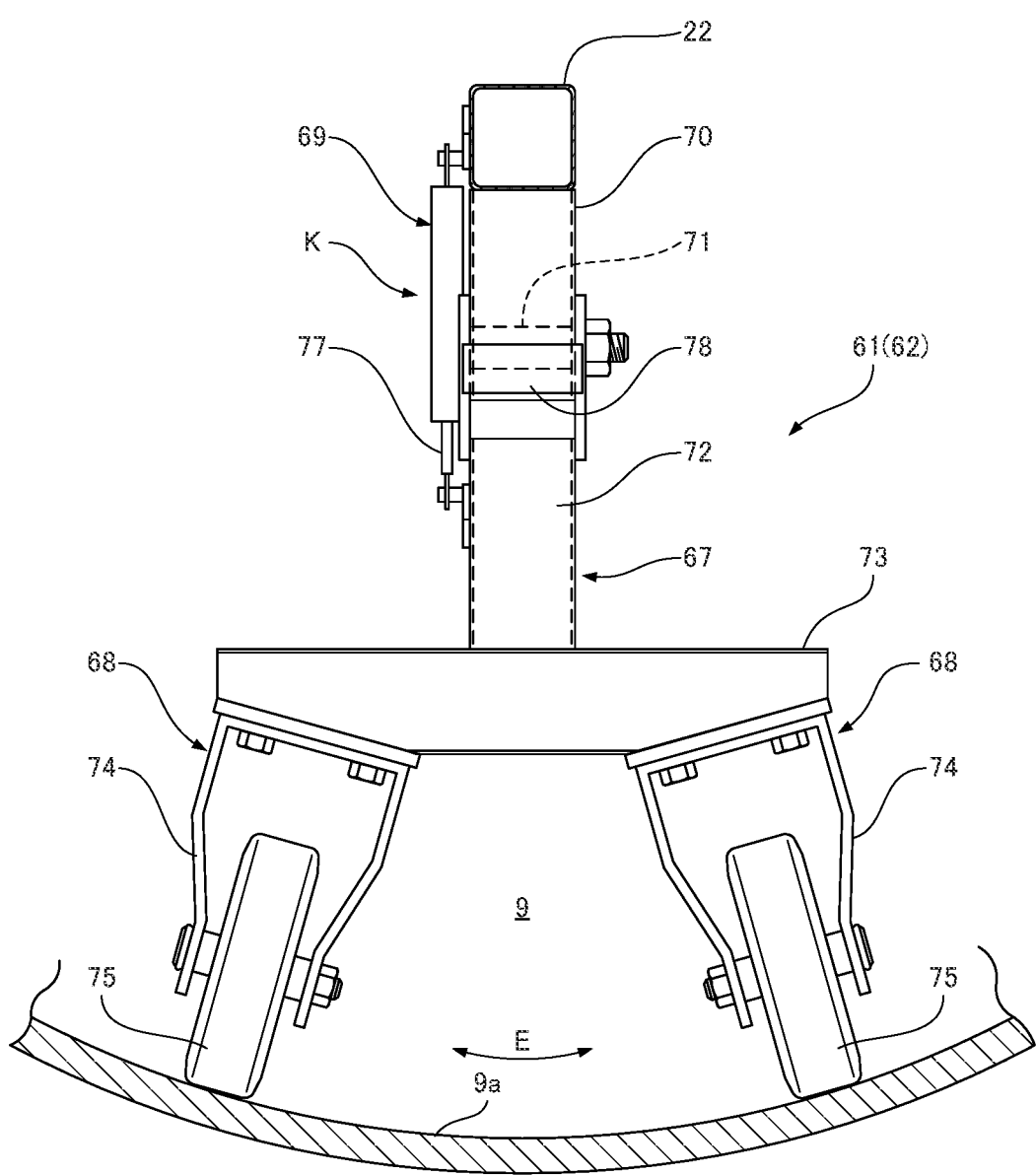
FIG. 6 is an arrow view taken along X-X in FIG. 5.
Figure 7:
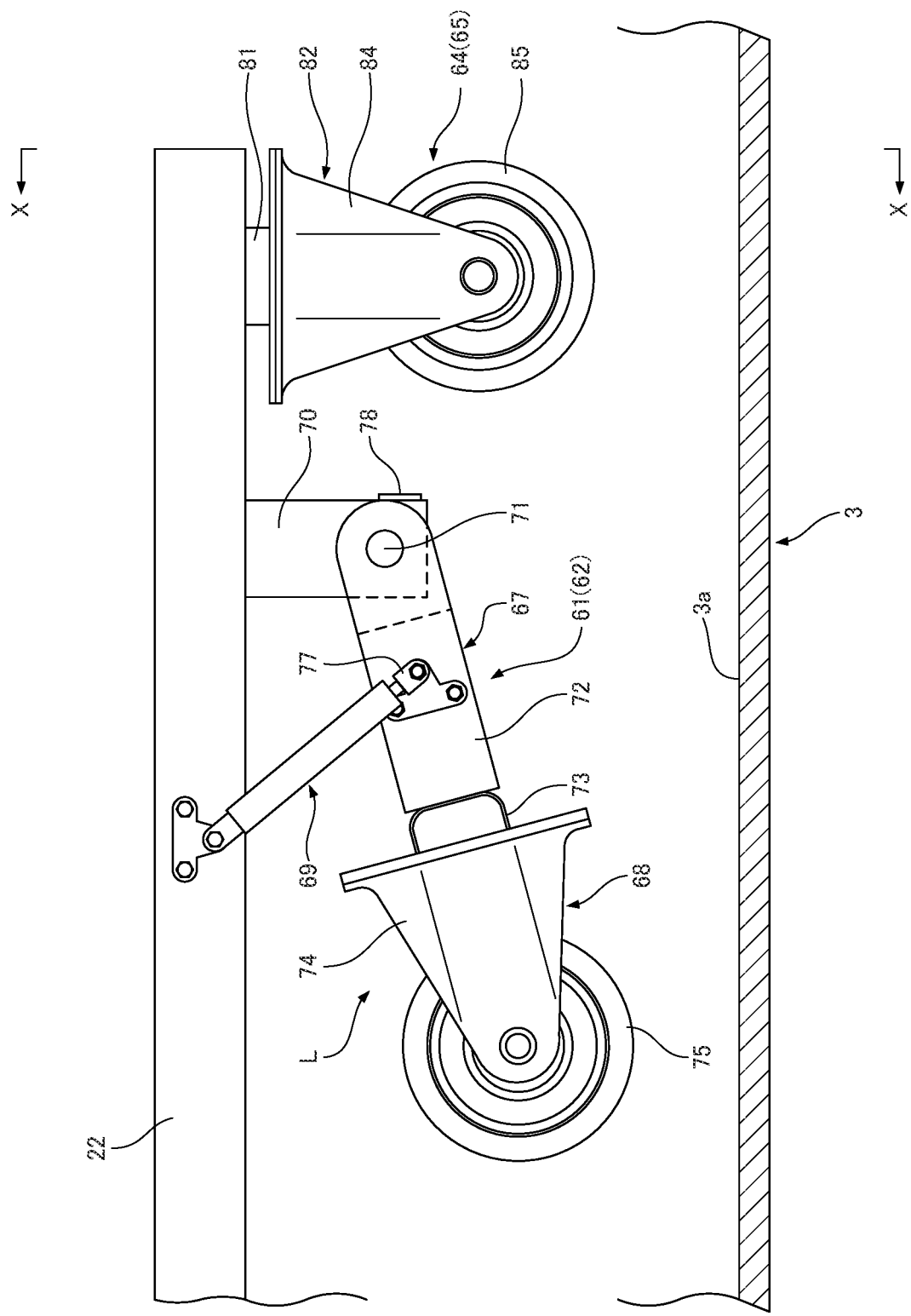
FIG. 7 is an enlarged side view of the first main supporting member and the first auxiliary supporting member of the watertightness testing device according to the first embodiment of the present invention showing a state where the first main supporting member has been switched to a folded posture.

As shown in FIGS. 5 to 7, the first main supporting member 61 is provided in a tip section of the moving operation rod 22 and has a leg frame 67 suspended downward from the moving operation rod 22, a pair of main wheel devices 68 provided in a lower end section of the leg frame 67, and a spring cylinder 69 (an example of an urging device) provided on the moving operation rod 22. The leg frame 67 has an upper frame 70 attached to the moving operation rod 22, a lower frame 72 pivotably coupled to a lower end section of the upper frame 70 via a coupling shaft 71, and an attached frame 73 provided in a lower end section of the lower frame 72.

In addition, the pair of main wheel devices 68 are distributed in a pipe circumferential direction E and has a bracket 74 attached to the attached frame 73 and a main wheel 75 (an example of a main rolling member) rotatably provided on the bracket 74.

The spring cylinder 69 has an extensible and retractable piston rod 77 and a tip of the piston rod 77 is coupled to the lower frame 72. The piston rod 77 is urged in an extending direction J by a spring built into the spring cylinder 69.

The first main supporting member 61 can be switched between a supporting posture K (refer to FIGS. 4 to 6 and 15) in which the first main supporting member 61 protrudes outside the socket 7 (an example of an end section of a pipe) of the pipes 2 and 3 and supports the moving operation rod 22 and a folded posture L (refer to FIGS. 7 and 12) in which the first main supporting member 61 is folded inside the pipe 3, and the first main supporting member 61 is urged toward the supporting posture K from the folded posture L by the spring cylinder 69. Due to the lower frame 72 pivoting around the coupling shaft 71, the lower frame 72 faces directly downward in the supporting posture K as shown in FIG. 5 but the lower frame 72 faces obliquely downward in the folded posture L as shown in FIG. 7.

The upper frame 70 of the leg frame 67 is provided with a regulating plate 78 which regulates pivoting of the lower frame 72 in the supporting posture K. When the lower frame 72 pivots in one direction from the folded posture L to be switched to the supporting posture K, the lower frame 72 is prevented from further pivoting in the one direction by coming into contact with the regulating plate 78.

As shown in FIG. 4, the second main supporting member 62 is positioned between the first main supporting member 61 and the testing device body 21 and has a similar configuration to the first main supporting member 61.

As shown in FIGS. 4, 5, 7, and 8, the first auxiliary supporting member 64 is provided between the tip of the moving operation rod 22 and the first main supporting member 61 and has an attached frame 81 attached to a lower side of the moving operation rod 22 and a pair of auxiliary wheel devices 82 provided in a lower end section of the attached frame 81.

The pair of auxiliary wheel devices 82 are distributed in the pipe circumferential direction E and have a bracket 84 attached to the attached frame 81 and an auxiliary wheel 85 (an example of an auxiliary rolling member) rotatably provided on the bracket 84.

As shown in FIG. 4, the second auxiliary supporting member 65 is positioned between the first main supporting member 61 and the second main supporting member 62 and has a similar configuration to the first auxiliary supporting member 64.

A watertightness testing method of testing watertightness of the joined section 4 of the pipes 2 and 3 using the watertightness testing device 1 described above will be described below.

First, as shown in FIG. 1, the plunger 45 of the double-acting jack 44 of the testing device body 21 is shortened and the first and second indenting members 29 and 30 are returned to the indentation releasing position P2. In addition, as shown in FIG. 4, in a state where the testing device body 21 is inserted into the first pipe 2, the moving operation rod 22 protruding outside from the socket 7 of the first pipe 2 is supported by the first and second main supporting members 61 and 62 in the supporting posture K.

In doing so, as shown in FIGS. 5 and 6, since the moving operation rod 22 is supported by the first and second main supporting members 61 and 62 as the main wheel 75 of the first and second main supporting members 61 and 62 comes into contact with the inner wall surface 9a of the conduit installation tunnel 9, the moving operation rod 22 can be prevented from becoming deflected or damaged.

While the main wheel 75 appears as though being levitated from the inner wall surface 9a of the conduit installation tunnel 9 in FIG. 5, this is because the position of the main wheel 75 is displaced in the pipe circumferential direction E with respect to a cross section of the conduit installation tunnel 9 shown in FIG. 5 (refer to FIG. 6).

In addition, the locking-ring 15 is housed in advance in the locking-ring housing groove 12 and the sealing body 16 is mounted in advance to the sealing body mounting depression 13 inside the socket 7 of the first pipe 2.

Figure 9:
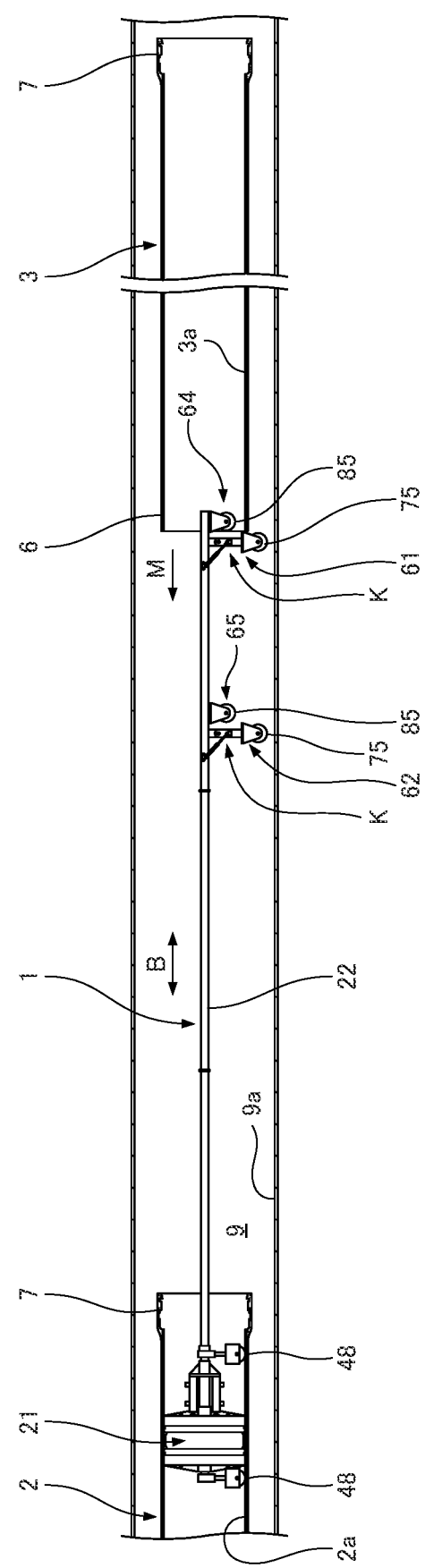
FIG. 9 is a diagram showing a procedure when performing a watertightness test using the watertightness testing device according to the first embodiment of the present invention.

Next, as shown in FIG. 9, the second pipe 3 loaded on a transfer carriage (not illustrated) or the like is moved in a joining direction M toward the socket 7 of the first pipe 2.

Figure 10:
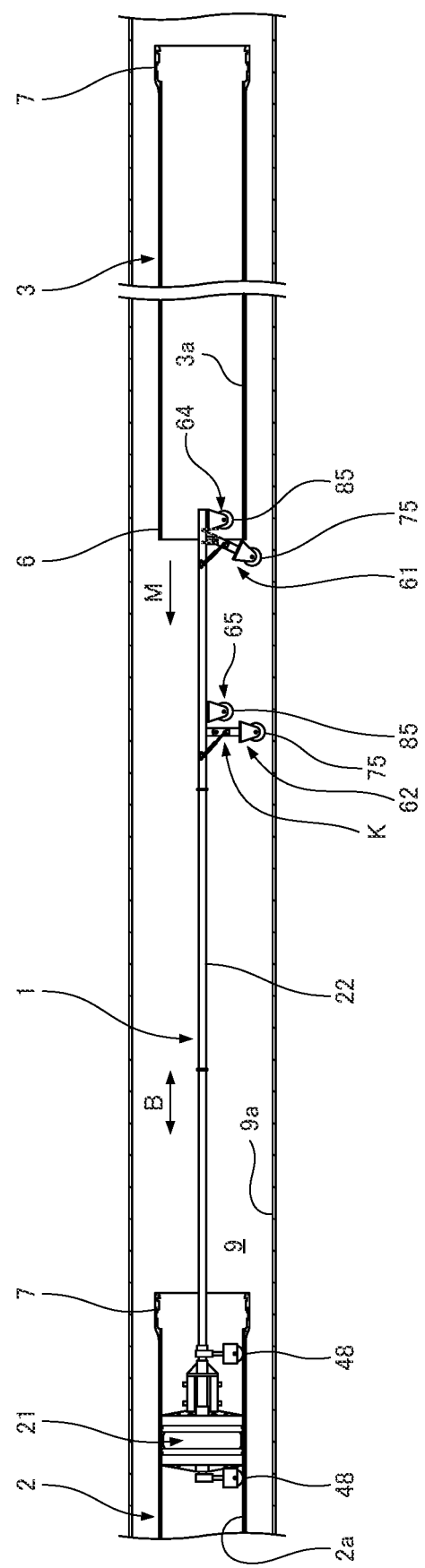
FIG. 10 is a diagram showing a procedure when performing a watertightness test using the watertightness testing device according to the first embodiment of the present invention.
Figure 11:
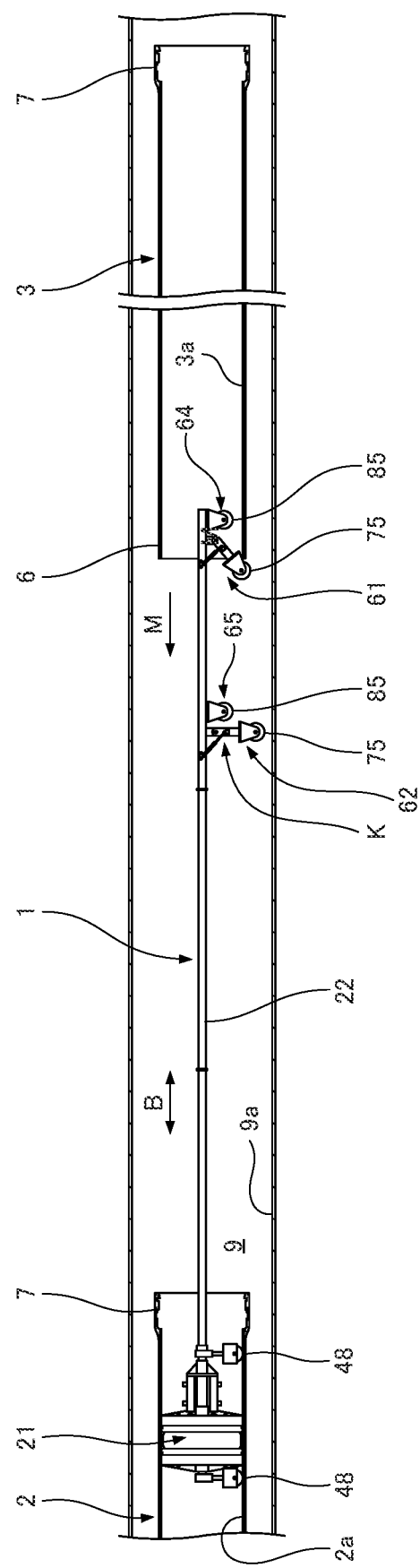
FIG. 11 is a diagram showing a procedure when performing a watertightness test using the watertightness testing device according to the first embodiment of the present invention.

Furthermore, as shown in FIGS. 10 and 11, due to the spigot 6 (the one end section) of the second pipe 3 coming into contact with the main wheel device 68 of the first main supporting member 61 and pushing the first main supporting member 61 in the joining direction M, as shown in FIG. 7, the first main supporting member 61 is switched from the supporting posture K to the folded posture L against an urging force of the spring cylinder 69 and retreats into the second pipe 3. Subsequently, as the spigot 6 of the second pipe 3 comes into contact with the main wheel device 68 of the second main supporting member 62 and pushes the second main supporting member 62 in the joining direction M, as shown in FIG. 12, the second main supporting member 62 is switched from the supporting posture K to the folded posture L against an urging force of the spring cylinder 69 and retreats into the second pipe 3.

Figure 8:
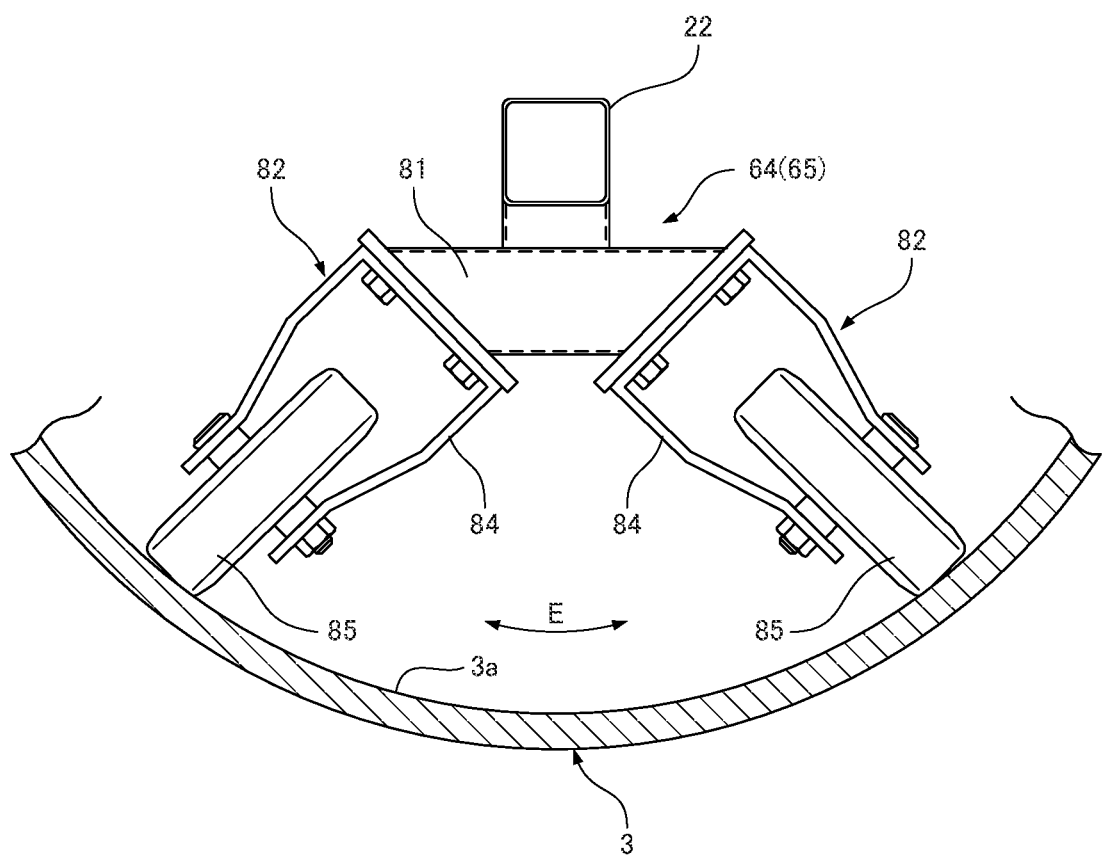
FIG. 8 is an arrow view taken along X-X in FIG. 7.

In a state where the moving operation rod 22 is inserted into the second pipe 3, the spigot 6 of the second pipe 3 is inserted into the socket 7 (the end section) of the first pipe 2 to join the second pipe 3 to the first pipe 2. As shown in FIGS. 8 and 12, in a state where the moving operation rod 22 is inserted into the second pipe 3, the auxiliary wheel 85 of the first and second auxiliary supporting members 64 and 65 comes into contact with the pipe inner surface 3a of the second pipe 3 and the first and second auxiliary supporting members 64 and 65 support the moving operation rod 22 inside the second pipe 3. Accordingly, the moving operation rod 22 can be prevented from becoming deflected or damaged.

Figure 12:
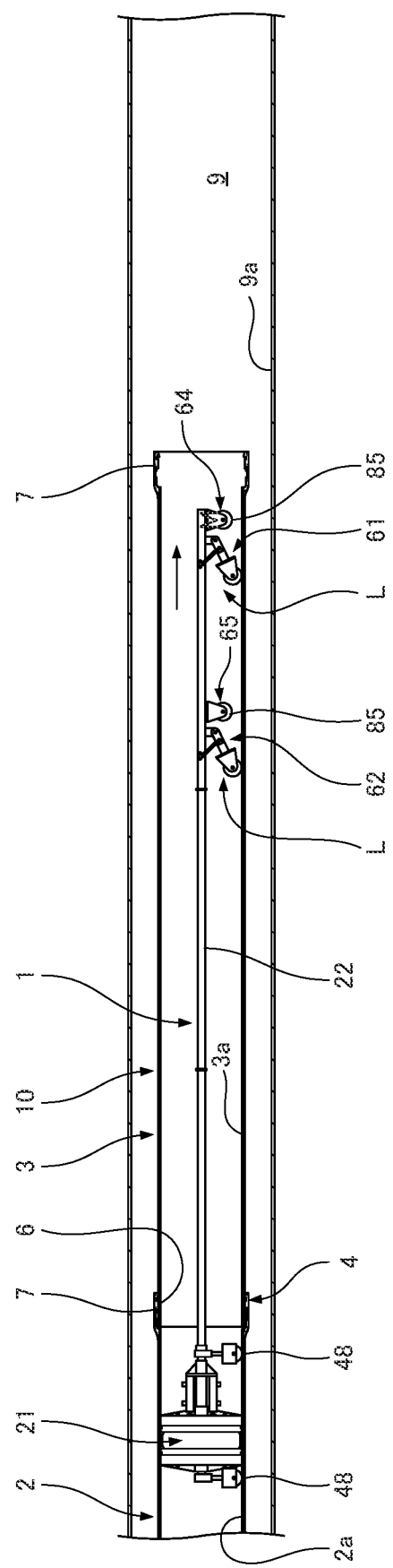
FIG. 12 is a diagram showing a procedure when performing a watertightness test using the watertightness testing device according to the first embodiment of the present invention.

While the auxiliary wheel 85 appears as though being levitated from the pipe inner surface 3a of the second pipe 3 in FIGS. 7 and 12, this is because the position of the auxiliary wheel 85 is displaced in the pipe circumferential direction E with respect to a cross section of the second pipe 3 shown in FIGS. 7 and 12 (refer to FIG. 8).

In addition, since the first and second main supporting members 61 and 62 are switched to the folded posture L and retreat into the second pipe 3 when joining the second pipe 3 to the first pipe 2, the first and second main supporting members 61 and 62 do not become a hindrance to joining the pipes 2 and 3.

After the second pipe 3 is joined to the first pipe 2 as described above, as shown in FIG. 13, the worker pulls the moving operation rod 22 from outside of the socket 7 (the other end section) of the second pipe 3 and moves the testing device body 21 to the joined section 4 between the first pipe 2 and the second pipe 3.

In doing so, as shown in FIG. 1, since the first and second indenting members 29 and 30 have been returned to the indentation releasing position P2, compression of the first and second sealing members 26 and 27 is released and the testing device body 21 can be readily moved in the pipe axial direction B.

In addition, when the worker pulls the moving operation rod 22 in the pipe axial direction B from outside of the socket 7 of the second pipe 3 as described above, as shown in FIGS. 7, 8, and 13, since the auxiliary wheel 85 of the first and second auxiliary supporting members 64 and 65 rotates on the pipe inner surface 3a of the second pipe 3 along the pipe axial direction B, the moving operation rod 22 can be readily operated in the pipe axial direction B.

Figure 13:
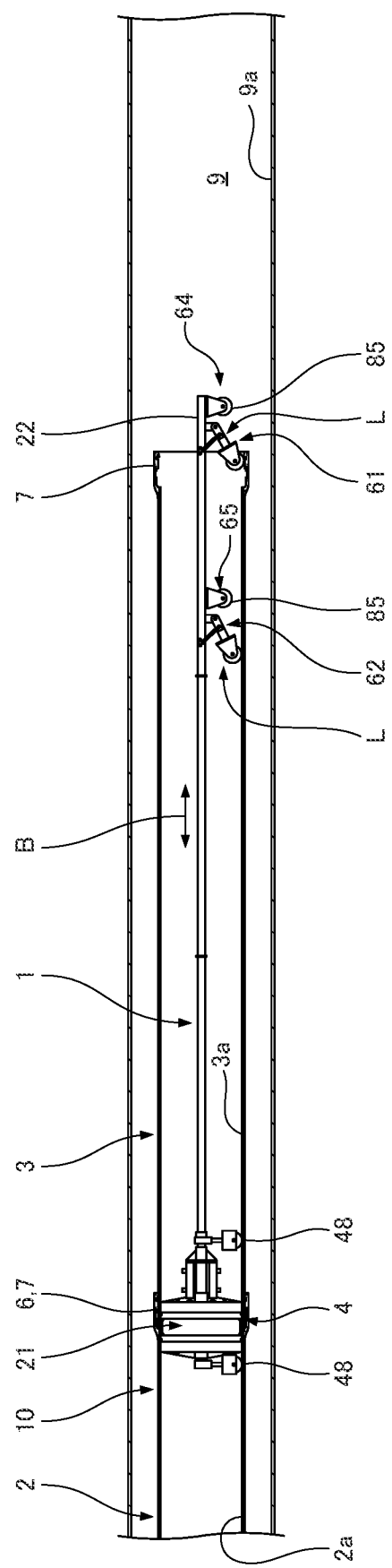
FIG. 13 is a diagram showing a procedure when performing a watertightness test using the watertightness testing device according to the first embodiment of the present invention.

As shown in FIG. 13, in a state where the testing device body 21 is positioned in the joined section 4, the tip section of the moving operation rod 22 protrudes outside from the socket 7 of the second pipe 3 (an end section of the joined pipes).

In addition, a watertightness test of the joined section 4 of the pipes 2 and 3 is performed using the testing device body 21. In doing so, as shown in FIG. 2, by extending the plunger 45 of the double-acting jack 44, the first indenting member 29 moves in the indenting direction C and reaches the indenting position P1. At the same time, the mobile rod 42 of the moving device 32 moves in an opposite direction G to the first indenting member 29 and the second indenting member 30 moves in the indenting direction C and reaches the indenting position P1.

Accordingly, the first indenting member 29 indents the first sealing member 26 into the first sealing member insertion space 37 and compresses the first sealing member 26 and the second indenting member 30 indents the second sealing member 27 into the second sealing member insertion space 38 and compresses the second sealing member 27. As a result, a space between the outer circumferential surface of the core 25 and the inner circumferential surface of the second pipe 3 is sufficiently sealed by the compressed first sealing member 26 and a space between the outer circumferential surface of the core 25 and the inner circumferential surface of the first pipe 2 is sufficiently sealed by the compressed second sealing member 27.

Subsequently, the hydraulic pump is activated to supply water 53 to the test space 50 from the water suction hose 54. Accordingly, while air inside the test space 50 and inside the sealing body mounting depression 13 is discharged through the air vent hose 57, the water 53 supplied to the test space 50 passes through the gap 51 and fills the sealing body mounting depression 13. In a state where the test space 50 and the sealing body mounting depression 13 are filled with the water 53 with predetermined pressure in this manner, a watertightness test of the joined section 4 of the pipes 2 and 3 is performed by inspecting a presence or absence of leakage or the like of the water 53 from the sealing body 16.

After performing the watertightness test of the joined section 4 as described above, by shortening the plunger 45 of the double-acting jack 44 as shown in FIG. 1, the first and second indenting members 29 and 30 are each returned to the indentation releasing position P2 and compression of the first and second sealing members 26 and 27 is released. Accordingly, a switch is made to a state where the testing device body 21 is readily movable in the pipe axial direction B.

Figure 14:
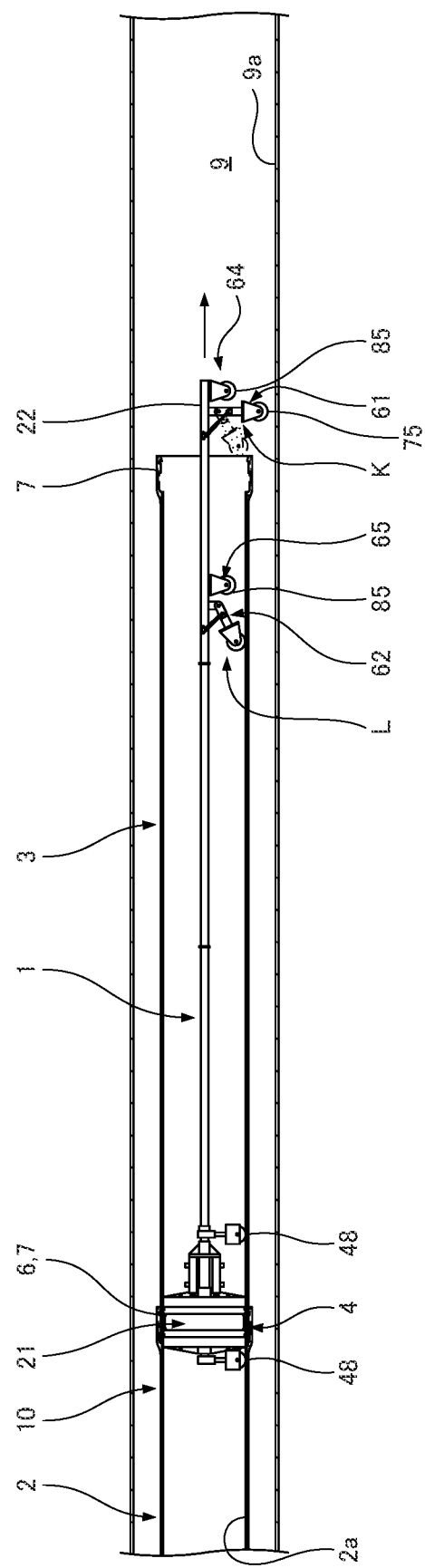
FIG. 14 is a diagram showing a procedure when performing a watertightness test using the watertightness testing device according to the first embodiment of the present invention.

In addition, as shown in FIG. 14, the worker pulls the moving operation rod 22 from outside of the socket 7 of the second pipe 3 and moves the testing device body 21 from the joined section 4 toward the socket 7 of the second pipe 3.

Figure 15:
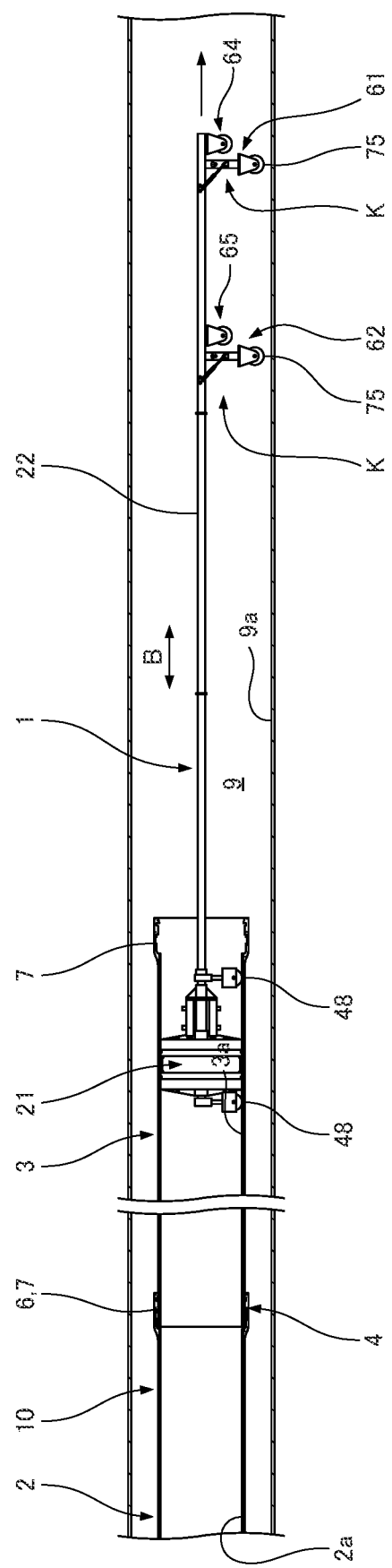
FIG. 15 is a diagram showing a procedure when performing a watertightness test using the watertightness testing device according to the first embodiment of the present invention.
Figure 16:
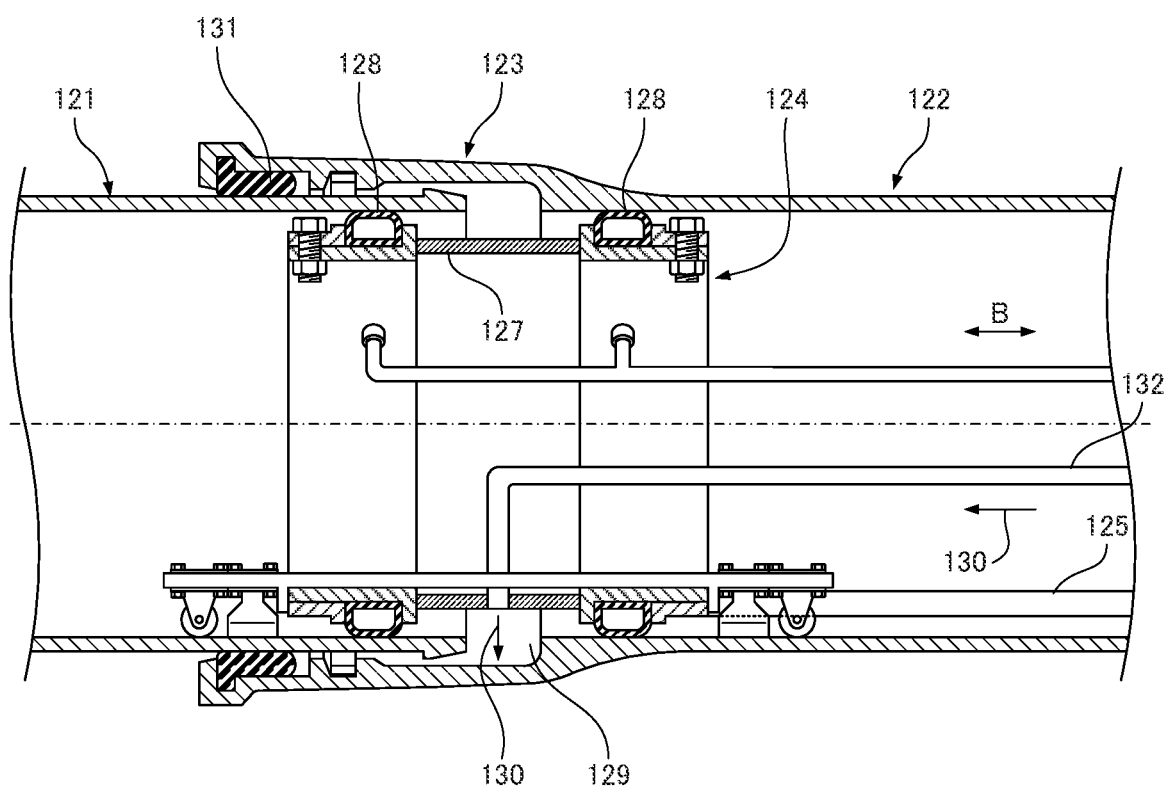
FIG. 16 is a sectional view of a conventional watertightness testing device.

Accordingly, first, the first main supporting member 61 protrudes outside from the socket 7 of the second pipe 3, the first main supporting member 61 is switched from the folded posture L to the supporting posture K by an urging force of the spring cylinder 69 and, as shown in FIGS. 5 and 6, the main wheel 75 of the first main supporting member 61 comes into contact with the inner wall surface 9a of the conduit installation tunnel 9. Subsequently, as shown in FIG. 15, furthermore, the second main supporting member 62 protrudes outside from the socket 7 of the second pipe 3, the second main supporting member 62 is switched from the folded posture L to the supporting posture K by an urging force of the spring cylinder 69, and the main wheel 75 of the second main supporting member 62 comes into contact with the inner wall surface 9a of the conduit installation tunnel 9. Accordingly, the moving operation rod 22 protruding outside from the socket 7 of the second pipe 3 is supported by the first and second main supporting members 61 and 62 and the moving operation rod 22 can be prevented from becoming deflected or damaged.

In addition, after a watertightness test as described above, when the worker pulls the moving operation rod 22 in the pipe axial direction B from outside of the socket 7 of the second pipe 3 as shown in FIG. 15, since the main wheel 75 of the first and second main supporting members 61 and 62 rotates in the pipe axial direction B on the inner wall surface 9a of the conduit installation tunnel 9 outside of the socket 7 of the second pipe 3, the moving operation rod 22 can be readily operated in the pipe axial direction B.

In addition, according to the watertightness testing method described above, as shown in FIG. 13, since the tip section of the moving operation rod 22 protrudes outside from the socket 7 of the second pipe 3 in a state where the testing device body 21 is positioned in the joined section 4 of the pipes 2 and 3, the worker can readily operate the tip section of the moving operation rod 22 from outside of the socket 7 of the second pipe 3 after performing a watertightness test of the joined section 4.

In addition, due to the moving wheel 48 of the testing device body 21 rotating on the pipe inner surfaces 2a and 3a of the pipes 2 and 3 when operating the moving operation rod 22 in the pipe axial direction B, the testing device body 21 readily and smoothly moves inside the pipes 2 and 3 in the pipe axial direction B in conjunction with the moving operation rod 22.

While the moving operation rod 22 is provided with the first and second main supporting members 61 and 62 and the first and second auxiliary supporting members 64 and 65 in the embodiment described above as shown in FIG. 4, the number of main supporting members 61 and 62 may be singular (one) or plural (three or more). In a similar manner, the number of the first and second auxiliary supporting members 64 and 65 may be singular (one) or plural (three or more).

While the two main wheels 75 are provided distributedly in the pipe circumferential direction E in the embodiment described above as shown in FIG. 6, one main wheel 75 may be provided directly underneath the moving operation rod 22 without being distributed.

While the two auxiliary wheels 85 are provided distributedly in the pipe circumferential direction E in the embodiment described above as shown in FIG. 8, one auxiliary wheel 85 may be provided directly underneath the moving operation rod 22 without being distributed.

Moreover, while a case where pipes are laid in the conduit installation tunnel 9 that is an existing pipeline, a tunnel, a shield, or the like has been described in the embodiments presented above, the present invention is not limited to cases inside the conduit installation tunnel 9 and can also be applied to a case (an open-cut method) in which pipes are laid inside a groove cut out from ground.

The invention claimed is:

1. A watertightness testing device for performing a watertightness test of a joined section between joined pipes, comprising:
   a testing device body which performs a watertightness test of the joined section of the joined pipes and a moving operation rod for moving the testing device body in the pipes in a pipe axial direction from outside an end section of the joined pipes, wherein
   the moving operation rod is provided in the testing device body and extends along the pipe axial direction,
   a main supporting member for supporting the moving operation rod is provided on the moving operation rod outside of the pipes, and
   the main supporting member has a rotatable main rolling member in a lower end section, the main supporting member is switchable between a supporting posture in which the main supporting member supports the moving operation rod outside of the pipes and a folded posture in which the main supporting member is folded inside the pipes, and the main supporting member is urged from the folded posture toward the supporting posture.

2. The watertightness testing device according to claim 1, wherein
   an auxiliary supporting member which supports the moving operation rod inside the pipes is provided on the moving operation rod, and
   the auxiliary supporting member has a rotatable auxiliary rolling member in a lower end section.

3. The watertightness testing device according to claim 1, wherein a tip section of the moving operation rod protrudes outside from an end section of the joined pipes in a state where the testing device body is positioned in the joined section of the pipes.

4. The watertightness testing device according to claim 1, wherein the testing device body has a rotatable moving rolling member for moving inside the pipes in the pipe axial direction.

5. A watertightness testing method using the watertightness testing device according to claim 1, the watertightness testing method comprising:
   supporting a moving operation rod protruding outside from an end section of a first pipe with a main supporting member in a supporting posture in a state where a testing device body is being inserted into the first pipe;
   moving a second pipe in a joining direction toward the end section of the first pipe;
   causing the main supporting member to be switched from the supporting posture to a folded posture and to retreat into the second pipe by having one end section of the second pipe come into contact with the main supporting member and push the main supporting member in the joining direction;
   joining the one end section of the second pipe to the end section of the first pipe in a state where the moving operation rod is inserted into the second pipe;
   operating the moving operation rod from outside of another end section of the second pipe to move the testing device body to a joined section between the first pipe and the second pipe; and
   after performing a watertightness test of the joined section with the testing device body, by operating the moving operation rod from outside of the other end section of the second pipe to move the testing device body from the joined section toward the other end section of the second pipe, causing the main supporting member to protrude outside from the other end section of the second pipe, to be switched from the folded posture toward the supporting posture, and to support the moving operation rod protruding outside from the other end section of the second pipe.

6. The watertightness testing method according to claim 5, wherein an auxiliary supporting member provided on the moving operation rod supports the moving operation rod in the second pipe in a state where the moving operation rod is being inserted into the second pipe.

7. The watertightness testing device according to claim 2, wherein a tip section of the moving operation rod protrudes outside from an end section of the joined pipes in a state where the testing device body is positioned in the joined section of the pipes.

8. The watertightness testing device according to claim 7, wherein the testing device body has a rotatable moving rolling member for moving inside the pipes in the pipe axial direction.

9. A watertightness testing method using the watertightness testing device according to claim 2, the watertightness testing method comprising:
   supporting a moving operation rod protruding outside from a end section of a first pipe with a main supporting member in a supporting posture in a state where a testing device body is being inserted into the first pipe;
   moving a second pipe in a joining direction toward the end section of the first pipe;
   causing the main supporting member to be switched from the supporting posture to a folded posture and to retreat into the second pipe by having one end section of the second pipe come into contact with the main supporting member and push the main supporting member in the joining direction;
   joining the one end section of the second pipe to the end section of the first pipe in a state where the moving operation rod is inserted into the second pipe;
   operating the moving operation rod from outside of another end section of the second pipe to move the testing device body to a joined section between the first pipe and the second pipe; and
   after performing a watertightness test of the joined section with the testing device body, by operating the moving operation rod from outside of the other end section of the second pipe to move the testing device body from the joined section toward the other end section of the second pipe, causing the main supporting member to protrude outside from the other end section of the second pipe, to be switched from the folded posture toward the supporting posture, and to support the moving operation rod protruding outside from the other end section of the second pipe.

10. The watertightness testing method according to claim 9, wherein the auxiliary supporting member provided on the moving operation rod supports the moving operation rod in the second pipe in a state where the moving operation rod is being inserted into the second pipe.

11. A watertightness testing method using the watertightness testing device according to claim 3, the watertightness testing method comprising:
   supporting a moving operation rod protruding outside from an end section of a first pipe with a main supporting member in a supporting posture in a state where a testing device body is being inserted into the first pipe;
   moving a second pipe in a joining direction toward the end section of the first pipe;
   causing the main supporting member to be switched from the supporting posture to a folded posture and to retreat into the second pipe by having one end section of the second pipe come into contact with the main supporting member and push the main supporting member in the joining direction;
   joining the one end section of the second pipe to the end section of the first pipe in a state where the moving operation rod is inserted into the second pipe;
   operating the moving operation rod from outside of another end section of the second pipe to move the testing device body to a joined section between the first pipe and the second pipe; and
   after performing a watertightness test of the joined section with the testing device body, by operating the moving operation rod from outside of the other end section of the second pipe to move the testing device body from the joined section toward the other end section of the second pipe, causing the main supporting member to protrude outside from the other end section of the second pipe, to be switched from the folded posture toward the supporting posture, and to support the moving operation rod protruding outside from the other end section of the second pipe.

12. The watertightness testing method according to claim 11, wherein an auxiliary supporting member provided on the moving operation rod supports the moving operation rod in the second pipe in a state where the moving operation rod is being inserted into the second pipe.

13. A watertightness testing method using the watertightness testing device according to claim 4, the watertightness testing method comprising:
   supporting a moving operation rod protruding outside from an end section of a first pipe with a main supporting member in a supporting posture in a state where a testing device body is being inserted into the first pipe;
   moving a second pipe in a joining direction toward the end section of the first pipe;
   causing the main supporting member to be switched from the supporting posture to a folded posture and to retreat into the second pipe by having one end section of the second pipe come into contact with the main supporting member and push the main supporting member in the joining direction;
   joining the one end section of the second pipe to the end section of the first pipe in a state where the moving operation rod is inserted into the second pipe;
   operating the moving operation rod from outside of another end section of the second pipe to move the testing device body to a joined section between the first pipe and the second pipe; and
   after performing a watertightness test of the joined section with the testing device body, by operating the moving operation rod from outside of the other end section of the second pipe to move the testing device body from the joined section toward the other end section of the second pipe, causing the main supporting member to protrude outside from the other end section of the second pipe, to be switched from the folded posture toward the supporting posture, and to support the moving operation rod protruding outside from the other end section of the second pipe.

14. The watertightness testing method according to claim 13, wherein an auxiliary supporting member provided on the moving operation rod supports the moving operation rod in the second pipe in a state where the moving operation rod is being inserted into the second pipe.

* * * * *